United States Patent [19]

Mori

[11] 4,436,083

[45] Mar. 13, 1984

[54] SUNBEAM CONCENTRATING AND COLLECTING APPARATUS

[76] Inventor: Kei Mori, 3-16-3-501, Kaminoge, Setagaya-ku, Tokyo, Japan

[21] Appl. No.: 317,453

[22] Filed: Nov. 2, 1981

[30] Foreign Application Priority Data

Nov. 6, 1980 [JP] Japan ................. 55-159013[U]

[51] Int. Cl.³ .............................................. F24J 3/02
[52] U.S. Cl. ..................................... 126/417; 126/440; 126/424; 350/96.20
[58] Field of Search ............... 126/440, 424, 425, 417, 126/451; 350/96.1, 96.18, 96.2, 96.22, 96.29, 96.27

[56] References Cited

U.S. PATENT DOCUMENTS

| 3,713,727 | 1/1979 | Markosian et al. | 126/451 X |
| 4,147,561 | 4/1979 | Knight | 126/440 X |
| 4,201,197 | 5/1980 | Dismer | 126/440 X |
| 4,307,934 | 12/1981 | Palmer | 350/96.18 X |

Primary Examiner—Larry Jones
Attorney, Agent, or Firm—Merchant, Gould, Smith, Edell, Welter & Schmidt

[57] ABSTRACT

A sunbeam concentrating and collecting apparatus comprising a lens system for concentrating sunbeams and a light conductor cable. In order to obtain the most effective concentrating of the sunbeams, a beam-receiving end face of the light conductor cable must be precisely registered with the focus of the lens system.

For this purpose, a cable holding means for holding the beam-receiving end face is constructed so as to be able to move and adjust in three directions perpendicular to one another at one point close to the focus of the lens system, by means of a position adjusting means. A light shielding plate is provided on the cable holding means.

8 Claims, 4 Drawing Figures

SUNBEAM CONCENTRATING AND COLLECTING APPARATUS

The present invention relates to an improvement of a sunbeam concentrating and collecting apparatus in which sunbeams are concentrated by a lens system and the concentrated sunbeams are guided into a light conductor cable and transmitted. More particularly, the present invention relates to a sunbeam concentrating and collecting apparatus of the above-mentioned type wherein concentrated sunbeams can be guided into the light conductor cable at a high efficiency.

In the present energy-saving age, much attention has been paid to the utilization of sunlight energy.

I was quick to note the effective utilization of sunlight energy for illumination and have made various proposals. The most effective utilization of sunlight energy is to utilize sunlight energy in the form of light energy directly for illumination without converting it to other forms of energy, such as electricity or heat. I once proposed a sunlight energy concentrating and collecting apparatus in which sunlight energy is concentrated and guided into a light conductor cable and the concentrated energy is transmitted through said light conductor cable to a place where illumination is required. When sunlight energy is thus transmitted through the light conductor cable and used for illumination, since there is no conversion loss, sunlight energy can be utilized most efficiently. However, it is practically impossible to guide all the concentrated sunlight energy into the light conductor cable, and the utilization efficiency is considerably low.

The invention as claimed is intended to overcome the aforementioned defect of prior techniques. It solves the problems by the fact that the holding means for holding the beam-receiving end face of the light conductor cable comprises a first moving and adjusting means capable of moving said beam-receiving end face of the light conductor cable in the direction of the optical axis of said lens system and a second moving and adjusting means capable of moving in two directions vertical to said optical axis and perpendicular to each other. It is preferable to provide fixing means on both ends of each moving and adjusting means.

The advantages offered by the present invention are that the beam-receiving end face of the light conductor cable can easily be registered with or contiguous with the focus of the lens system and firm locking is assured after the registering operation, whereby the above-mentioned defect of the conventional technique is eliminated.

The way of carrying out the present invention is described in detail below with reference to several drawings which illustrate specific embodiments, in which.

Figure 1:
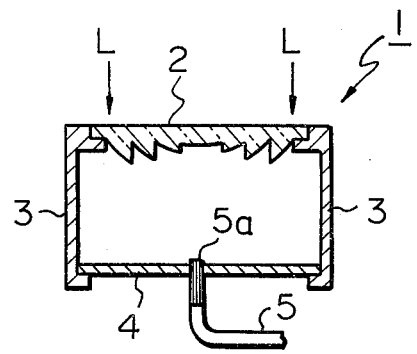
FIG. 1 is a schematic diagram illustrating the entire structure of a conventional sunbeam concentrating and collecting apparatus to which the present invention is applied.

FIG. 1 is a schematic diagram illustrating the entire structure of a conventional sunbeam concentrating and collecting apparatus to which the present invention is applied. As shown in FIG. 1, the sunbeam concentrating and collecting apparatus 1 comprises a lens system 2 for concentrating sunbeams L, a holding frame 3 and bottom plate 4 for holding said lens system 2 and a light conductor cable 5 into which the sunbeams concentrated by the lens system 2 are guided. The sunbeams concentrated by the lens system 2 are transmitted to a required place through said light conductor cable 5. In the sunbeam concentrating and collecting apparatus having the above-mentioned structure, if the position of the beam-receiving end face 5a of the light conductor cable 5 is not registered with the focus position of the lens system 2, sunbeams concentrated by the lens system 2 cannot be guided into the light conductor cable 5 at a high efficiency, and therefore, the registering operation of the end face 5a is very troublesome. Furthermore, even if the above two positions are precisely registered with each other at the assembling step, when locking is not firm, during use of the apparatus a shear is produced between the two positions by vibration or the like and re-adjustment for the registering is very difficult and troublesome.

Figure 2:
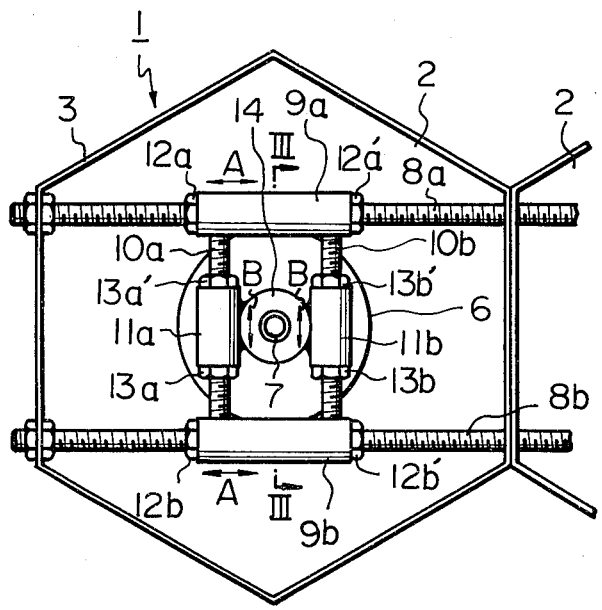
FIG. 2 is a bottom view illustrating one embodiment of the sunbeam concentrating and collecting apparatus according to the present invention.
Figure 3:
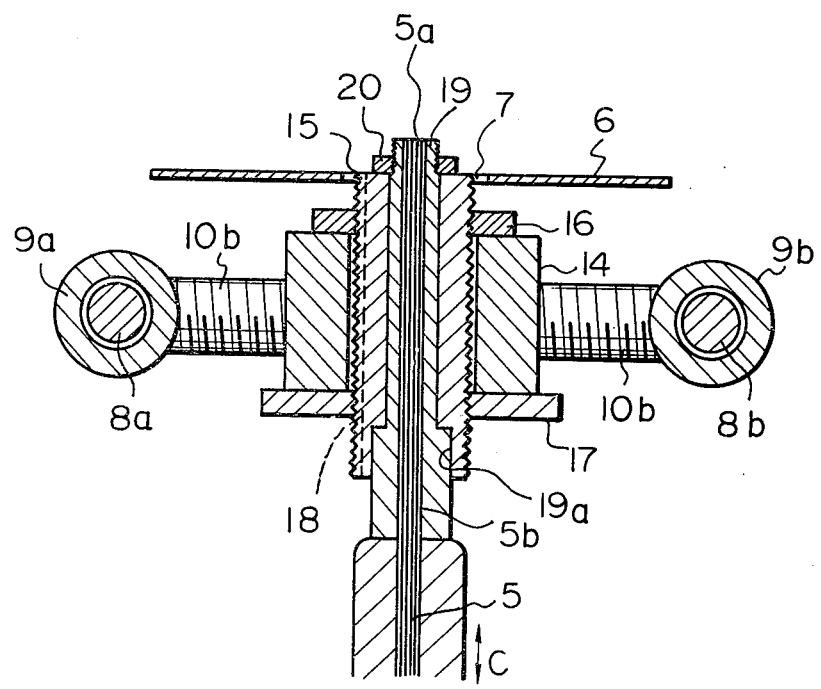
FIG. 3 is an enlarged view showing the cross section taken along the line III—III in FIG. 2, which illustrates the state where a light conductor cable is arranged.

FIG. 2 is a bottom view showing one embodiment of the sunbeam concentrating and collecting apparatus of the present invention. The sunbeam concentrating and collecting apparatus 1 comprising, a Fresnel lens 2 having, for example, a substantially hexagonal shape and a holding frame 3 for holding the Fresnel lens 2. Sunbeams concentrated by the Fresnel lens 2 are guided to a hole 7 which is provided with a light conductor cable, which is formed substantially at the center of a light-shielding plate 6, as in the sunbeam concentrating and collecting apparatus shown in FIG. 1. As shown in FIG. 3, the light-receiving end face 5a of a light conductor cable 5 is arranged on the hole 7. Accordingly, as described hereinbefore with reference to FIG. 1, the sunbeams concentrated by the Fresnel lens 2 are guided into the light conductor cable 5 and they are transmitted to a required place through the light conductor cable 5 and then used for illumination. As described hereinbefore, in the sunbeam concentrating and collecting apparatus having such structure, it is necessary to register the beam-receiving end face 5a of the light conductor cable 5 with the focus of the lens system 2. According to the present invention, this registering operation can be performed easily and assuredly. Referring to FIG. 2, bolt shafts 8a and 8b are arranged parallel to each other in the bottom portion of the sunbeam concentrating and collecting apparatus 1 and are secured to the holding frame 3. Cylinders 9a and 9b are arranged on the bolt shafts 8a and 8b so that the cylinders 9a and 9b can move on the bolt shafts 8a and 8b in a direction indicated by the arrow A. Two bolt shafts 10a and 10b traversing the bolt shafts 8a and 8b at right angles are arranged parallel between the cylinders 9a and 9b. Cylinders 11a and 11b are arranged on the bolt shafts 10a and 10b so that the cylinders 11a and 11b can move on the bolt shafts 10a and 10b in a direction indicated by the arrow B. The light-shielding plate 6 having the hole 7 on which the beam-receiving end face 5a of the light conductor cable 5 is to be arranged is integrally attached to the cylinders 11a and 11b. Accordingly, by moving the cylinders 9a and 9b in the direction A and- /or moving the cylinder 11a and 11b in the direction B, the position of the hole 7 of the light-shielding plate 6 can be adjusted in the vicinity of the focus of the lens system 2 on a plane parallel to the plane of the drawings. In the apparatus of the present invention, when it is intended to move the cylinders 9a and 9b in the direction A, nuts 12a and 12a' on the bolt shaft 8a and nuts 12b and 12b' on the bolt shaft 8b are loosened so as to produce a state where the cylinders 9a and 9b are movable in the direction A. When it is intended to move the cylinders 11a and 11b in the direction B, nuts 13a and 13a' on the bolt shaft 10a and nuts 13b and 13b' on the bolt shaft 10b are loosened so as to produce a state where the cylinders 11a and 11b are movable in the direction B. After the cylinders 9a, 9b, 11a and 11b have thus been rendered movable, the hole 7 of the light-shielding plate 6 is located at a requied position, and then, the cylinders 9a, 9b, 11a and 11b are clamped by the nuts 12a, 12a', 12b, 12b', 13a, 13a', 13b and 13b', whereby each cylinder is fixed on the corresponding bolt shafts by two nuts and is assuredly locked. Therefore, a shear in the positions is not caused after the registering operation.

FIG. 3 is a view showing the cross section taken along the line III—III in FIG. 2, which illustrates the state where the light conductor cable 5 is arranged on the hole 7 of the light-shielding plate 6 shown in FIG. 2. A seat 14 is integrally attached to the cylinders 11a and 11b, and hence, the seat 14 is arranged so that it can move in both the direction A and the direction B as shown in FIG. 2. A cylinder 15 is disposed to hold the light conductor cable 5 movably in a direction indicated by the arrow C. Screws to be engaged with nuts 16 and 17 are formed on the periphery of the cylinder 15, and a groove 18 to be engaged with a projection (not shown) of the seat 14 is formed on the outer side of the cylinder 15 in the axial direction thereof. Accordingly, if the nuts 16 and 17 are loosened, the cylinder 15 is placed in a state where the cylinder 15 can move in the direction C while being guided by the groove 18. When the cylinder 15 is located at a required position, the nuts 16 and 17 are clamped, and the cylinder 15 is a assuredly secured at this position and a shear in the position is not substantially produced after this registering operation. The light conductor cable 5 is inserted into the cylinder 15 and the beam-receiving end face 5a of the cable 5 is projected to the top face of the light-shielding plate 6 through the hole 7, and as described hereinbefore, the sunbeams concentrated by the lens system 2 are guided into the light conductor cable 5 through the beam-receiving end face 5a. The covering of the light conductor cable 5 is cut away on the end portion thereof to leave fibers 5b alone. The fibers 5b are secured by a cylindrical fitting 19 to construct an end portion of the light conductor cable. The periphery of the upper portion of the cylindrical fitting 19 is screwed and a rotation-preventing square part 19a is formed in the lower portion of the cylindrical fitting 19. The upper screwed portion of the cylindrical fitting 19 is secured to the cylinder 15 by means of a nut 20. When the end portion of the light conductor cable 5 is thus secured to the cylinder 15, since the cylinder 15 is movable in the direction C as described hereinbefore, the beam-receiving end face 5a of the light conductor cable 5 can be located at an optional position in the direction C. By this adjustment as well as the above-mentioned adjustments in the directions A and B, the beam-receiving end face 5a of the light conductor cable 5 can correctly be registered with the focus of the lens system 2.

Figure 4:
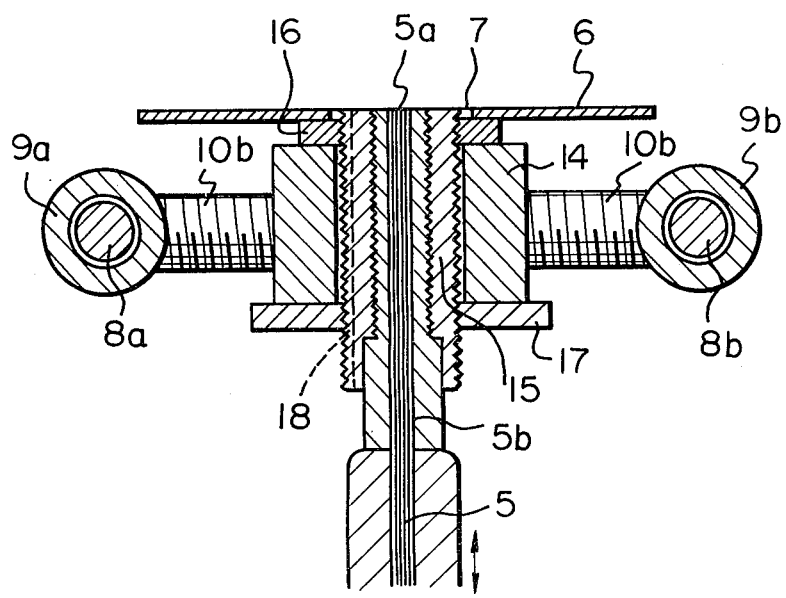
FIG. 4 is a cross-sectional view, similar to FIG. 3, of an alternate embodiment of the sunbeam concentrating and collecting apparatus according to the present invention.

FIG. 4 is a cross-sectional view showing an alternate embodiment of the present invention.

In the case of the embodiment shown in FIGS. 2 and 3, the light-shielding plate 6 having a hole 7 in which the beam-receiving end face 5a of the light conduction cable 5 is to be arranged in integrally attached to the cylinders 11a and 11b, and the periphery of the upper portion of the cylindrical fitting 19 is screwed thereon and the rotation-preventing square part 19a is formed in the lower portion of said cylindrical fitting 19, so as to secure the upper screwed portion to the cylinder 15 by means of the nut 20.

Contrary to the above, according to the alternate embodiment shown in FIG. 4, such a light-shielding plate 6 is not attached to the cylinders 11a and 11b but is firmly secured to one of the nuts 16 and 17 (for example, to the nut 16) by means of screwing, welding or the like. The cylinder 15 is provided with two holes along the longitudinal axis thereof, and screws to be engaged with a screwed smaller diametered upper portion of the cylindrical fitting 19 are formed on the inner wall of the smaller diametered upper hole of the cylinder 15. It should be noted that there is no necessity for matching the larger diametered lowered portion of the cylindrical fitting 19 with the larger diametered lower hole of the cylinder 15.

As can readily be understood, the clamping of nut 16 is accomplished just by turning the light-shielding plate 6 manually and the clamping of the nut 20 (FIG. 3) can be eliminated.

As will readily be understood from the foregoing description, according to the present invention, when the beam-receiving end face of the light conductor cable is registered with the focus of the lens system, adjustments in three directions substantially rectangular to one another can be performed at one point close to the focus of the lens system. Therefore, the adjusting operation can remarkably be facilitated. Furthermore, since each adjusting (holding) member is secured by two nuts after the registering operation, no substantial shear in the position of the beam-receiving end face is produced after the registering operation has been accomplished. These are advantages attained by the present invention.

The invention has been described in detail with particular reference to preferred embodiment thereof, but it will be understood that reasonable variations and modifications are possible without departing from the spirit and basic scope of the invention.

I claim:

1. A sunbeam concentrating and collecting apparatus comprising a lens system for concentrating sunbeams and a light conductor cable having a beam-receiving end face thereof arranged at the focus of said lens system, wherein sunbeams concentrated by said lens system are guided into said light conductor cable, said apparatus comprising: a cable holding means and a position adjusting means, said cable holding means being intended to hold said beam-receiving end face of the light conductor cable, said position adjusting means having a first adjusting means which supports said cable holding means and is capable of moving said beam-receiving end face of the light conductor cable in the direction of the optical axis perpendicular to each other; and said apparatus further including a light-shielding plate provided on the sunbeam concentrating side of said cable holding means and said position adjusting means, said light-shielding plate surrounding said beam receiving end face of the light conductor cable.

2. A sunbeam concentrating and collecting apparatus as set forth in claim 1, wherein each of said first and second adjusting means comprises at least two sets of bolt shafts and cylinders, and on both ends of each cylinder, fixing means are arranged to fix said cylinder at a required position along said bolt shaft.

3. A sunbeam concentrating and collecting apparatus as set forth in claim 2, wherein said fixing means are nuts.

4. A sunbeam concentrating and collecting apparatus as set forth in claim 1, wherein said light-shielding plate is firmly secured to at least two cylinders of said second adjusting means.

5. A sunbeam concentrating and collecting apparatus as set forth in claim 1, wherein said light-shielding plate is firmly secured to one of the nuts of said first adjusting means.

6. A sunbeam concentrating and collecting apparatus as set forth in claim 1, wherein the periphery of the upper portion of said cable holding means is screwed and a rotation-preventing part is formed in the lower portion thereof.

7. A sunbeam concentrating and collecting apparatus as set forth in claim 1, wherein the periphery of said cable holding means is screwed so as to screw in said first adjusting means.

8. A sunbeam concentrating and collecting apparatus comprising a lens system for concentrating sunbeams and a light conductor cable having a beam-receiving end face thereof arranged at the focus of said lens system, wherein sunbeams concentrating by said lens system are guided into said light conductor cable, said apparatus comprising: a cable holding means and a position adjusting means, said cable holding means being intended to hold said beam-receiving end face of the light conductor cable, said position adjusting means having a first adjusting means which supports said cable holding means and is capable of moving said beam-receiving end face of the light conductor cable in the direction of the optical axis of said lens system, and a second adjusting means capable of moving in two directions vertical to said optical axis and peripendicular to each other, each of said first and second adjusting means comprises at least two sets of bolt shafts and cylinders, and on both ends of each cylinder, fixing means are arranged to fix said cylinder at a required position along said bolt shaft;

said apparatus further including means for assuredly locking said cylinders on said bolt shafts to prevent shear of the positions of said light conductor cable with respect to said lens system;

said apparatus further including a light-shielding plate provided on means and a position adjusting means, said light-shielding plate surrounding said beam receiving end face of the light conductor cable.

* * * * *